(12) United States Patent
MacGregor

(10) Patent No.: US 7,992,126 B2
(45) Date of Patent: Aug. 2, 2011

(54) APPARATUS AND METHOD FOR QUANTITATIVELY MEASURING THE BALANCE WITHIN A BALANCED SCORECARD

(75) Inventor: John Malcolm MacGregor, Ascot (GB)

(73) Assignee: Business Objects Software Ltd., Dublin (IE)

( * ) Notice: Subject to any disclaimer, the term of this patent is extended or adjusted under 35 U.S.C. 154(b) by 1109 days.

(21) Appl. No.: 11/679,763

(22) Filed: Feb. 27, 2007

(65) Prior Publication Data

US 2008/0208528 A1   Aug. 28, 2008

(51) Int. Cl.
G06F 9/44      (2006.01)
G06Q 10/00     (2006.01)

(52) U.S. Cl. .................. 717/102; 717/101; 705/7.39
(58) Field of Classification Search .......... None
See application file for complete search history.

(56) References Cited

U.S. PATENT DOCUMENTS

| | | | |
|---|---|---|---|
| 7,158,940 B2* | 1/2007 | Cimral et al. | 705/7.39 |
| 7,734,489 B2* | 6/2010 | Cimral et al. | 705/7.39 |
| 7,756,734 B2* | 7/2010 | Cimral et al. | 705/7.39 |
| 7,953,626 B2* | 5/2011 | Wright et al. | 705/7.39 |
| 2004/0010772 A1* | 1/2004 | McKenna et al. | 717/101 |
| 2004/0068429 A1* | 4/2004 | MacDonald | 705/10 |
| 2004/0221259 A1* | 11/2004 | Devore et al. | 717/102 |
| 2005/0240898 A1* | 10/2005 | Mankotia et al. | 717/101 |
| 2006/0101048 A1* | 5/2006 | Mazzagatti et al. | 707/101 |
| 2006/0161471 A1* | 7/2006 | Hulen et al. | 705/10 |
| 2007/0250615 A1* | 10/2007 | Hillier | 709/223 |
| 2007/0265863 A1* | 11/2007 | Tien et al. | 705/1 |

OTHER PUBLICATIONS

"Using the balanced scorecard process to compute the value of software applications", S. Dolins, May 2006, pp. 881-884, <http://delivery.acm.org/10.1145/1140000/1134441/p881-dolins.pdf>.*
"A balanced approach to IT project management", Brock et al., Sep. 2003, pp. 2-10, <http://delivery.acm.org/10.1145/960000/954015/p2-brock.pdf>.*

* cited by examiner

*Primary Examiner* — Thuy Dao
(74) *Attorney, Agent, or Firm* — Mintz, Levin, Cohn, Ferris, Glovsky and Popeo, P.C.

(57) ABSTRACT

A computer-readable storage medium to direct a computer to function in a specified manner includes executable instructions to: process a balanced scorecard to generate a hierarchical tree; classify the parent to child relationships in the hierarchical tree; identify the quantitative associations among the parent to child relationships; and assess the balance within the balanced scorecard.

15 Claims, 7 Drawing Sheets

APPARATUS AND METHOD FOR QUANTITATIVELY MEASURING THE BALANCE WITHIN A BALANCED SCORECARD

BRIEF DESCRIPTION OF THE INVENTION

The present invention relates generally to data processing. More particularly, the present invention relates to a technique for quantitatively measuring the balance within a balanced scorecard.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information, content delivery infrastructure systems for delivery and management of reports and analytics, data warehousing systems for cleansing and consolidating information from disparate sources, and data management systems, such as relational databases or On Line Analytic Processing (OLAP) systems used to collect, store, and manage raw data.

There are a number of commercially available products to produce reports from stored data. For instance, Business Objects Americas of San Jose, Calif., sells a number of widely used report generation products, including Crystal Reports™, Business Objects OLAP Intelligence™, Business Objects Web Intelligence™, and Business Objects Enterprise™. As used herein, the term report refers to information automatically retrieved (i.e., in response to computer executable instructions) from a data source (e.g., a database, a data warehouse, a plurality, of reports and the like) where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document and the like.

A report document specifies how to access data and format it. A report document where the content does not include external data, either saved within the report or accessed live, is a template document for a report rather than a report document. Unlike other non-report documents that may optionally import external data within a document, a report document by design is primarily a medium for accessing and formatting, transforming or presenting external data.

A report is specifically designed to facilitate working with external data sources. In addition to information regarding external data source connection drivers, the report may specify advanced filtering of data, information for combining data from different external data sources, information for updating join structures and relationships in report data, and logic to support a more complex internal data model (that may include additional constraints, relationships, and metadata).

In contrast to a spreadsheet, a report is generally not limited to a table structure but can support a range of structures, such as sections, cross-tables, synchronized tables, sub-reports, hybrid charts, and the like. A report is designed primarily to support imported external data, whereas a spreadsheet equally facilitates manually entered data and imported data. In both cases, a spreadsheet applies a spatial logic that is based on the table cell layout within the spreadsheet in order to interpret data and perform calculations on the data. In contrast, a report is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheets generally work within a looping calculation model, whereas a report may support a range of calculation models. Although there may be an overlap in the function of a spreadsheet document and a report document, these documents express different assumptions concerning the existence of an external data source and different logical approaches to interpreting and manipulating imported data.

A tool often used by management to measure an organization's vision and strategies in conjunction with report documents is a balanced scorecard. A balanced scorecard translates an enterprise's overall business strategy into specific quantifiable goals to allow management to evaluate organization performance in terms of achieving these goals. Management may identify a long term objective or strategy and use a balanced scorecard to assess the most effective measures that need to be taken to achieve the objective or strategy. The balanced scorecard provides feedback for both internal business processes and external outcomes to facilitate continuous evaluation and improvement of strategic performance and results by specifying cause and effect relationships among financial and non-financial data associated with an enterprise. The cause and effect relationships may include customer data, operational data, development data, and employee data. Each form of data offers a different view of the effect of measures taken in a given division of an organization. For example, the customer data may relate to company measures that have a direct impact on customers and their satisfaction (e.g. customer surveys, customer complaints, customer call processing times, etc.). The scorecard may also include lead and lag indicators. Lag indicators represent outcomes that influence the current performance of an organization for which a strategy has been defined. Lead indicators represent outcomes that management wishes to achieve now in order to drive some future performance.

The present invention relates to the analytical and reporting aspects of balanced scorecards. Management's ability to successfully use a balanced scorecard to achieve their desired strategic business objectives has become increasingly important to providing a comprehensive view of the performance of a business. One critical attribute of a balanced scorecard that helps to ensure a consistent and unbiased measurement for management is balance. An unbalanced scorecard may yield an inaccurate or unreliable measure of a company's activities, thereby clouding any given long term management objective. While there are existing tools that facilitate the creation and analysis of balanced scorecards, these tools do not allow for a quantitative measure of a balanced scorecard to determine the balance associated with it.

Therefore, it would be desirable to provide a new technique that provides a measure of balance within a balanced scorecard to ensure a consistent and unbiased measurement. In particular, it would be desirable to provide a method to quantitatively measure the balance within a scorecard to determine the reliability and accuracy of the scorecard.

SUMMARY OF THE INVENTION

The invention includes a computer-readable storage medium to direct a computer to function in a specified manner. The computer-readable storage medium includes executable instructions to, process a balanced scorecard to generate a hierarchical tree; classify the parent to child relationships in the hierarchical tree; identify the quantitative associations among the parent to child relationships; and assess the balance within the scorecard.

The invention also includes a computer implemented method of processing data, comprising: processing a balanced scorecard to generate a hierarchical tree; classifying the parent to child relationships in the hierarchical tree; identifying the quantitative associations among the parent to child relationships; and assessing the balance within the scorecard.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION OF THE INVENTION

Figure 1:
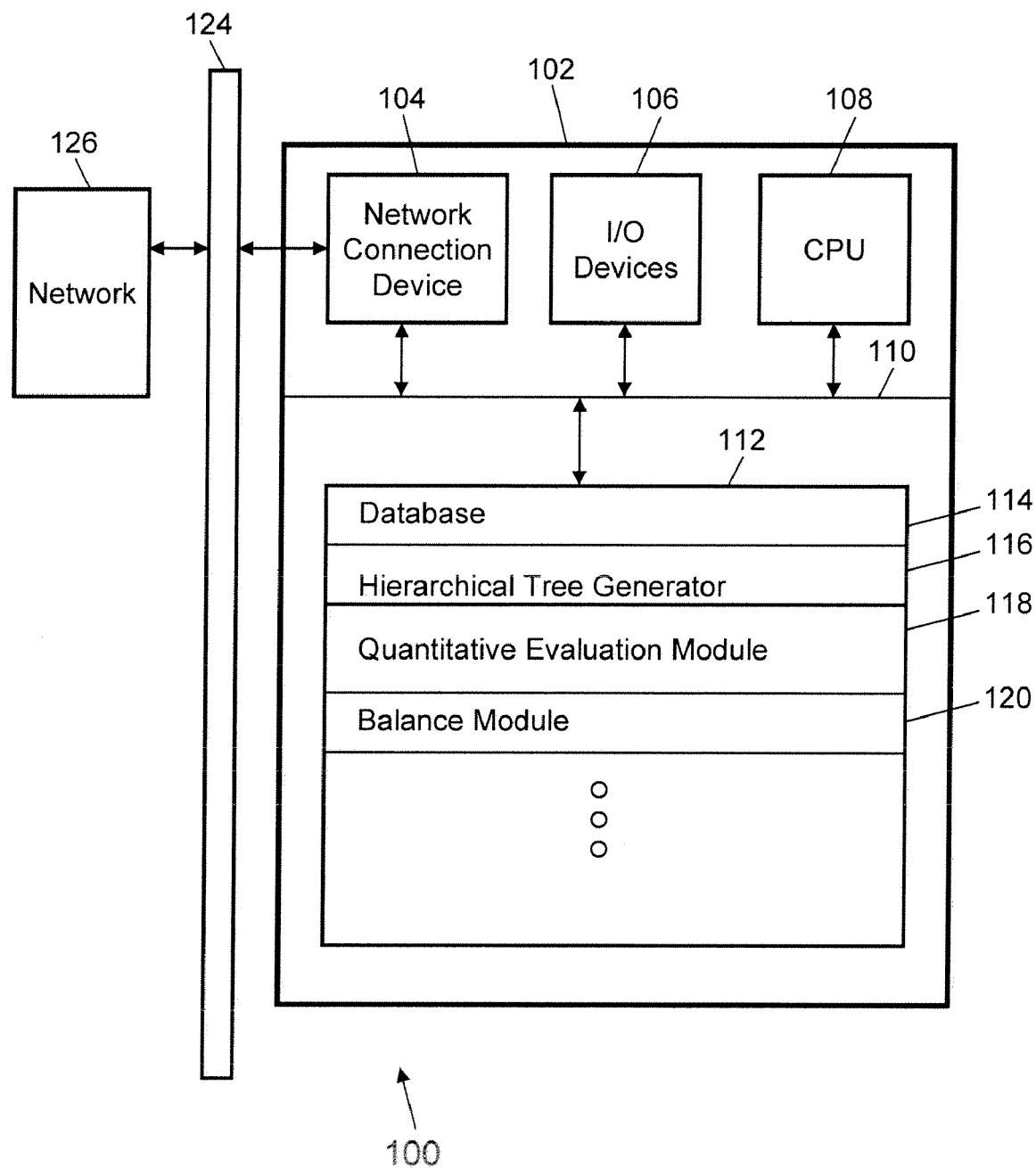
FIG. 1 illustrates a computer that may be operated in accordance with an embodiment of the invention.

FIG. 1 illustrates a computer network 100 that may be operated in accordance with an embodiment of the invention. The computer network 100 includes a computer 102, which, in general may be a client computer or a server computer. In the present embodiment of the invention, the computer 102 is a server computer including conventional server computer components. As shown in FIG. 1, the computer 102 includes a Central Processing Unit ("CPU") 108 that is connected to a network connection device 104 and a set of input/output devices 106 (e.g., a keyboard, a mouse, a display, a printer a speaker, and so forth) via a bus 110. The network connection device 104 is connected to network 126 through a network transport medium 124, which may be any wired or wireless transport medium.

The CPU 108 is also connected to a memory 112 via the bus 110. The memory 112 stores a set of executable programs. One executable program is the hierarchical tree generator 116. The hierarchical tree generator 116 includes executable instructions to access a data source to produce a hierarchical tree of parent to child relationships. By way of example, the data source may be database 114 resident in memory 112. The data source may be located anywhere in the network 126. A hierarchical tree is a representation of the hierarchical relationships that exist in a balanced scorecard, and may include the relationship between business data, strategic data, and initiative data.

As shown in FIG. 1, the memory 112 also contains a quantitative evaluation module 118. The quantitative evaluation module 118 enables the associations among the various parent to child relationships in the hierarchical tree generated by the hierarchical tree generator 116 to be quantitively classified. The quantitative evaluation module 118 includes executable instructions to access a data source to quantitively characterize the parent to child relationships for a balanced scorecard. By way of example, the data source may be database 114 resident in memory 112. FIG. 1 also shows that memory 112 contains a balance module 120. The balance module 120 determines the balance within a scorecard. In one embodiment of the invention, the balance module 120 analyzes the quantitative classifications made by the quantitative evaluation module 118 to ultimately determine whether a balanced scorecard is actually balanced.

While the various components of memory 112 are shown residing in the single computer 102, it should be recognized that such a configuration is not required in all applications. For instance, the balance module 120 may reside in a separate computer (not shown in FIG. 1) that is connected to the network 126. Similarly, separate modules of executable code are not required. The invention is directed toward the operations disclosed herein. There are any number of ways and locations to implement those operations, all of which should be considered within the scope of the invention.

Figure 2:
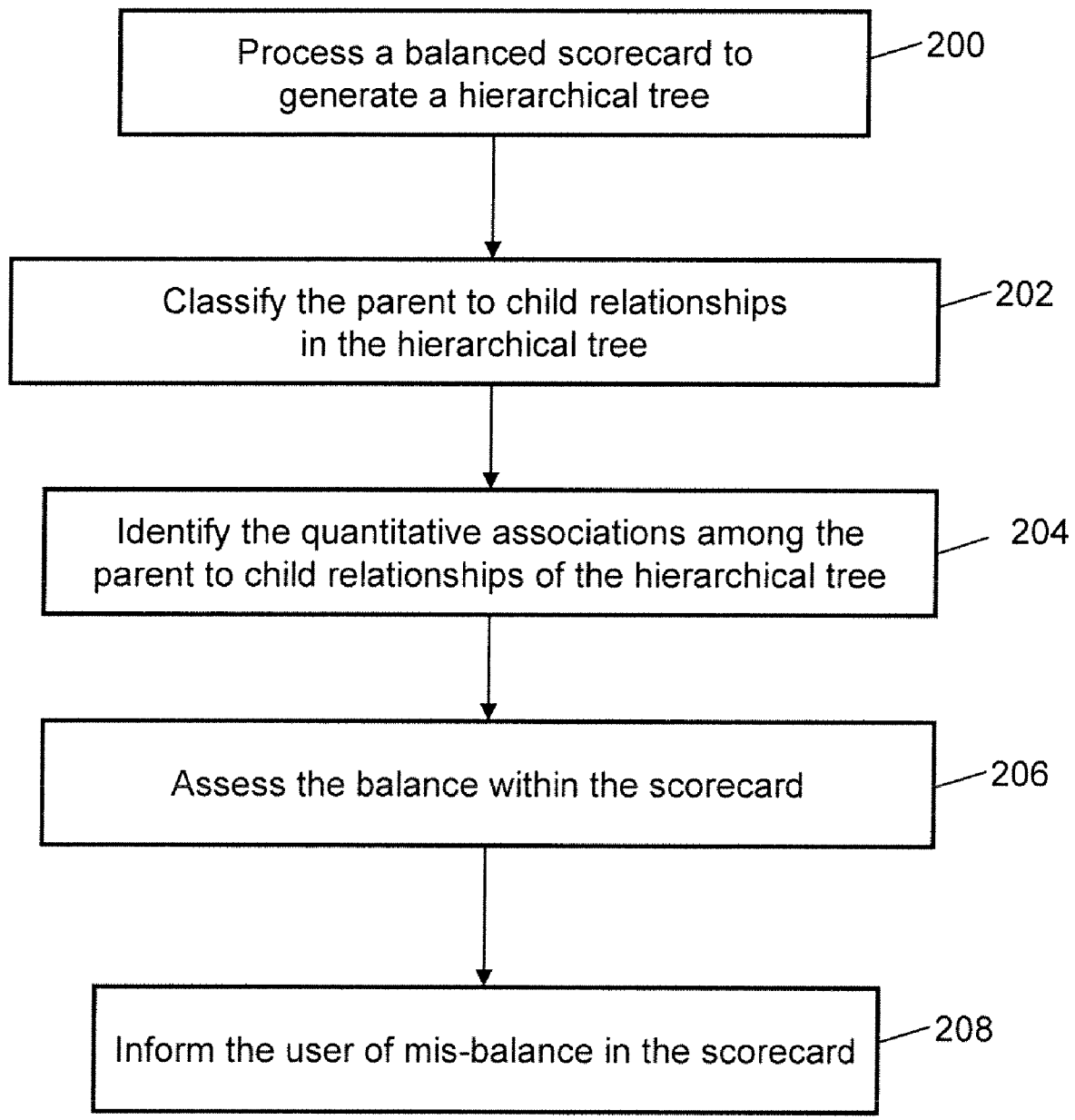
FIG. 2 illustrates processing operations performed in accordance with an embodiment of the invention.
Figure 3:
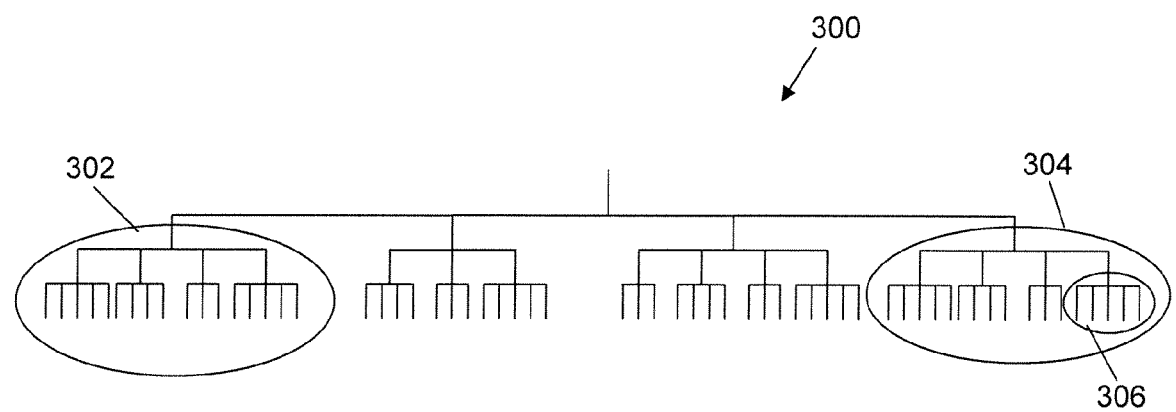
FIG. 3 illustrates an exemplary hierarchical tree for a balanced scorecard.

FIG. 2 illustrates processing operations associated with an embodiment of the invention. The first processing operation shown in FIG. 2 is to process a balanced scorecard to generate a hierarchical tree 200 that characterizes the parent to child relationships for a balanced scorecard. In one embodiment of the invention, this is implemented with executable code of the hierarchical tree generator 116. The hierarchical tree generator 116 may generate a hierarchical tree that depicts the parent to child relationships between organization data, strategic data, and initiative data. For example, FIG. 3 illustrates an example of a hierarchical tree 300 characterizing the relationship for a balanced scorecard among business data 302 and 304, which has a subset of initiative data 306 that may be generated by the hierarchical tree generator 116. By way of example, one subset of the business data 304 may be customer data. Management may determine that one of their strategic objectives is to increase customer satisfaction with enterprise customer support. Accordingly, an increase in customer support satisfaction may be included as strategic objective data 304. It may then be determined that one way to increase customer support satisfaction is to increase the number of customer service representatives to thereby decrease customer wait time for support. As a result, an increase in the number of customer service representatives may be included as additional entries associated with the initiative data 306.

Figure 4:
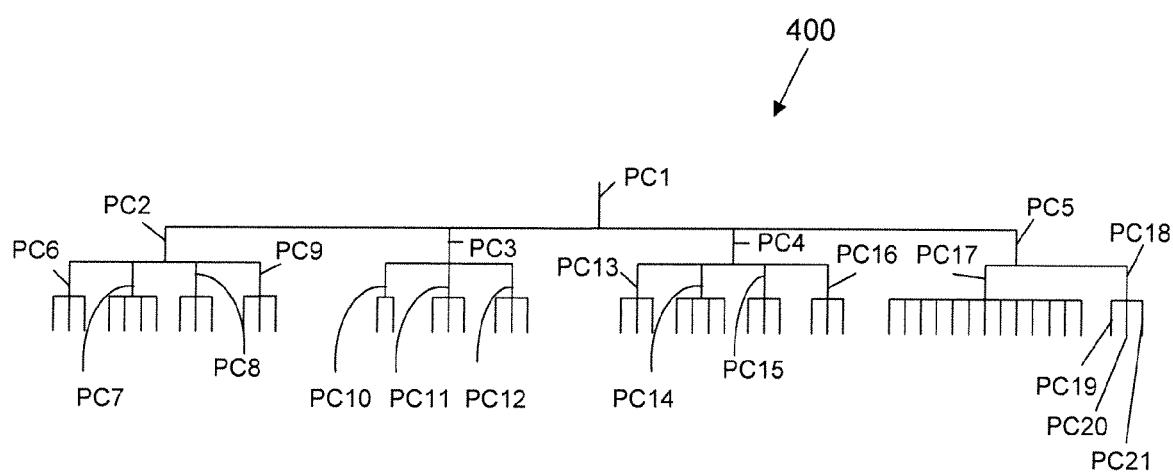
FIG. 4 illustrates an exemplary tree with 18 parent to child relationships.

As shown in FIG. 2, the next processing operation is to classify the parent to child relationships in the hierarchical tree 202. The quantitative evaluation module 118 may classify the parent to child relationships of the hierarchical tree generated by the hierarchical tree generator 116. Each parent to child relationship in the hierarchical tree is categorized quantitatively by its order in relation to the rest of the hierarchical tree and by the number of children in the relationship. Within each hierarchical tree there are 1 to N parent to child relationships. For instance, FIG. 4 illustrates a hierarchical tree 400 that contains 18 parent to child relationships (e.g. N=18) numbered PC1-PC18. Each parent to child relationship in the figure can be classified by the number of children, M, in the relationship. For example, PC1 has 4 children (i.e., PC2, PC3, PC4 and PC5; therefore, M=4). PC18 has 3 children (i.e., PC19, PC20 and PC21; therefore, M=3). Each parent to child relationship in the hierarchical tree may be defined by the specific number of children in the relationship. Thus, the quantitative evaluation module 118 may classify each parent to child relationship in the hierarchical tree by determining its order in relation to the rest of the tree and the number of children in the relationship.

Figure 5:
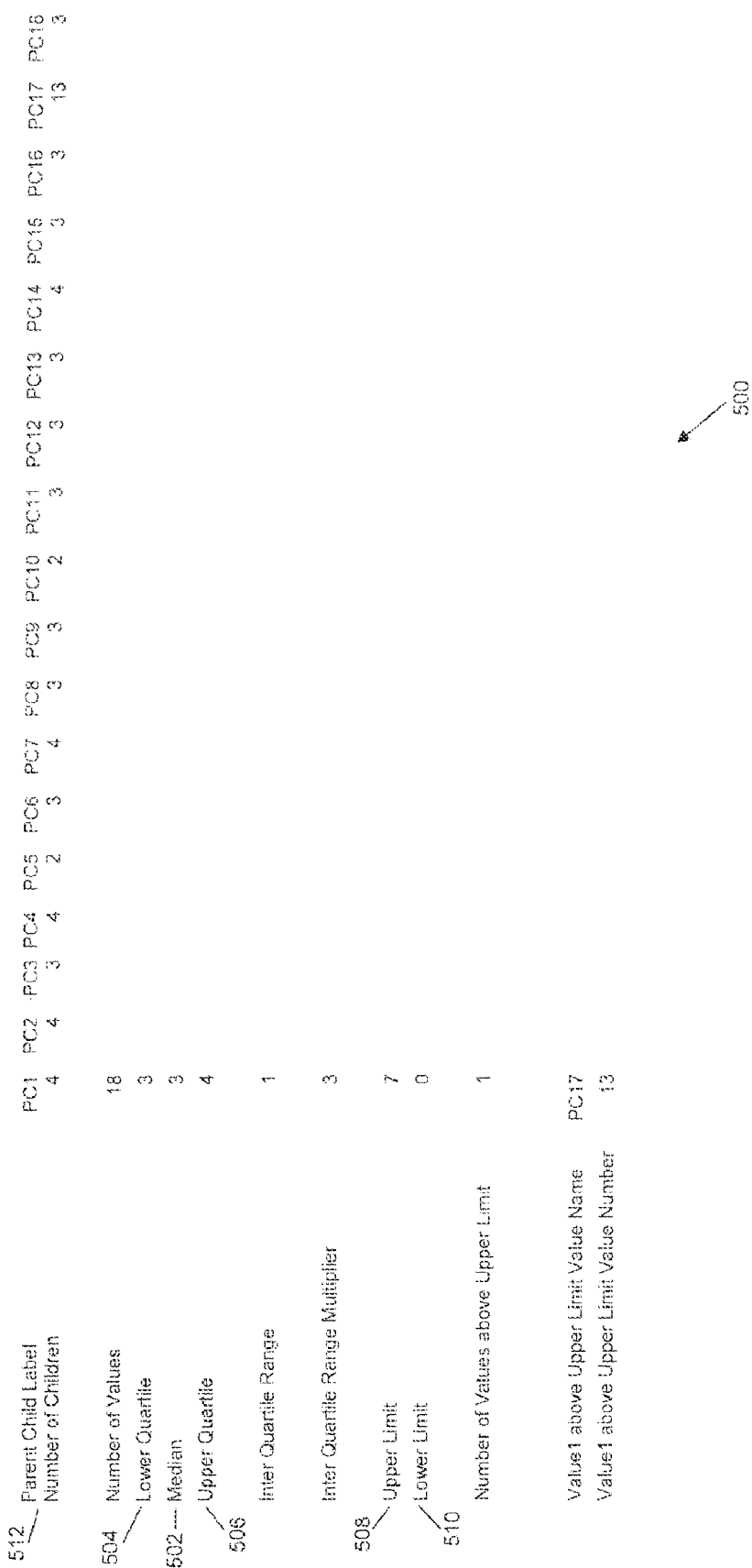
FIG. 5 illustrates an exemplary user interface to report balance within the hierarchical tree of FIG. 4.

Returning to FIG. 2, the next processing operation is to identify the quantitative associations among the parent to child relationships of the hierarchical tree 204. The quantitative evaluation module 118 may use the classification made earlier for each parent to child relationship to identify the quantitative associations that exist within the hierarchical tree. To illustrate, FIG. 5 shows a user interface screen 500 that may be shown in conjunction with one embodiment of the invention that presents the associations identified in the hierarchical tree 400. Various statistical tests may be applied to the hierarchical tree to identify the quantitative associations therein. As shown in FIG. 5, the quantitative evaluation module 118 may determine the median 502, lower quartile 504, upper quartile 506, an upper limit 508, and a lower limit 510 for the set of children 512 in the hierarchical tree 400. The quantitative evaluation module 118 may also identify any outliers for the set of children in a hierarchical tree. Outliers in the set of children may be identified using a Tukey's test as described in the commonly owned patent entitled "Apparatus and Method for Identifying Patterns in a Multi-Dimensional Database", Ser. No. 10/113,917, filed Mar. 28, 2002. For the hierarchical tree 400, an outlier was identified at the parent to child relationship PC17 of the hierarchical tree 400 of FIG. 4. PC17 is deemed an outlier because it has 13 children.

As shown in FIG. 2, the next processing operation is to assess the balance within the scorecard 206. The balance module 120 may use the classifications and identifications made by the quantitative evaluation module 118 to quantitatively determine the balance within the scorecard. For example, a mis-balance can exist if any one of three conditions is not satisfied. First, a scorecard is unbalanced if the total number of parents in the scorecard is less than three. Secondly, a scorecard is unbalanced if either one of the lead or lag indicators is less than a user defined percentage of the total number of indicators in the scorecard. By way of example, the percentage may be 25%.

Figure 6:
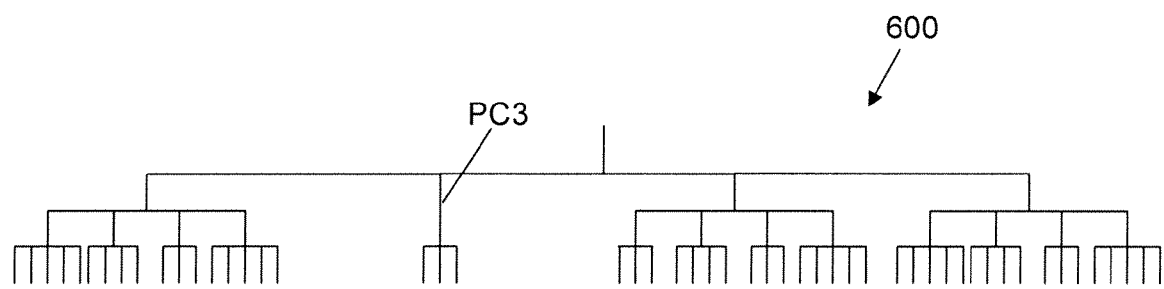
FIG. 6 illustrates an unbalanced scorecard where one parent to child relationship in the hierarchical tree is below a specified threshold.
Figure 7:
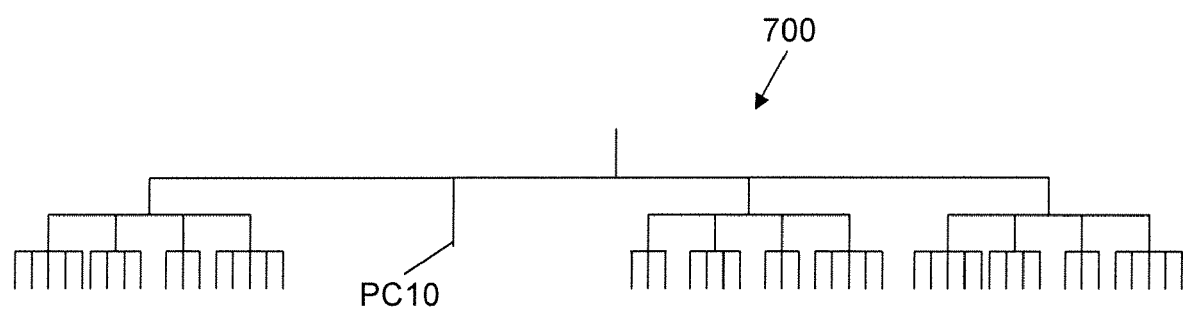
FIG. 7 illustrates an unbalanced scorecard where one parent to child relationship in the hierarchical tree has no children.

Lastly, a scorecard may be unbalanced depending on the parent to child relationships in its hierarchical tree. If the quantitative evaluation module 118 finds an outlier in the set of numbers defined by the number of children in each parent to child relationship then the balanced scorecard is mis-balanced. In addition, there are two other circumstances where a scorecard may be unbalanced depending on the relationships in its hierarchical tree. A minimum threshold number of children (e.g., 4) may be required for balance. FIG. 6 illustrates PC3 of the hierarchical tree 600 having only three children. If the threshold is four there is a lack of balance. Similarly, a scorecard may be unbalanced where there are no children in a parent to child relationship. This occurrence is shown in FIG. 7 where PC10 for the hierarchical tree 700 has no children. Any number of balance criteria may be used in accordance with embodiments of the invention.

The last processing operation shown in FIG. 2 is to inform the user or mis-balance in the scorecard 208. The balance module 120 may use the determination made earlier to produce a user interface screen to indicate mis-balance. If the balanced scorecard has mis-balance, the user interface screen may give the reason for the imbalance. For example, the GUI of FIG. 5 may include highlighted items indicative of mis-balance. Ultimately, this will enable management to ensure that they are relying on a consistent and unbiased balanced scorecard to drive future business performance.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

While the present invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt to a particular situation, material, composition of matter, method, process step or steps, to the objective, spirit and scope of the present invention. All such modifications are intended to be within the scope of the claims appended hereto. In particular, while the methods disclosed herein have been described with reference to particular steps performed in a particular order, it will be understood that these steps may be combined, sub-divided, or re-ordered to form an equivalent method without departing from the teachings of the present invention. Accordingly unless specifically indicated herein, the order and grouping of the steps is not a limitation of the present invention.

What is claimed is:

1. A computer implemented method of processing data, comprising:
    generating a hierarchical tree from a balanced scorecard;
    classifying the parent to child relationships in the hierarchical tree, each parent to child relationship in the hierarchical tree being categorized quantitatively by its order in relation to a remaining portion of the hierarchical tree and by a number of children in such parent to child relationship;
    identifying the quantitative associations among the parent to child relationships, wherein the quantitative associations include statistical measures characterizing the parent to child relationships;
    assessing balance within the balanced scorecard by applying balance criteria to the quantitative associations, one of the applied balance criteria being lag and lead indicators less than a user defined percentage of a total number of indicators in the balanced scorecard, the lag indicators representing outcomes influencing a current performance, and the lead indicators representing outcomes influencing a future performance; and
    informing a user of a mis-balance within the balanced scorecard.

2. The method of claim 1, wherein identifying includes detecting an outlier pattern, a median, an upper quartile, and a lower quartile for a set of numbers.

3. The method of claim 2, wherein detecting includes applying a statistical test.

4. The method of claim 3, wherein the statistical test is a Tukey Test.

5. The method of claim 1, wherein informing includes displaying a user interface specifying information characterizing the mis-balance in the balanced scorecard.

6. A non-transitory computer-readable storage medium to direct a computer to function in a specified manner, comprising executable instructions to:
generate a hierarchical tree from a balanced scorecard;
classify the parent to child relationships in the hierarchical tree, each parent to child relationship in the hierarchical tree being categorized quantitatively by its order in relation to a remaining portion of the hierarchical tree and by a number of children in such parent to child relationship;
identify the quantitative associations among the parent to child relationships, wherein the quantitative associations include statistical measures characterizing the parent to child relationships;
assess balance within the balanced scorecard by applying balance criteria to the quantitative associations, one of the applied balance criteria being lag and lead indicators less than a user defined percentage of a total number of indicators in the balanced scorecard, the lag indicators representing outcomes influencing a current performance, and the lead indicators representing outcomes influencing a future performance; and
inform a user of a mis-balance within the balanced scorecard.

7. The non-transitory computer-readable storage medium of claim 6, wherein the executable instructions to identify include executable instructions to detect at least one of an outlier pattern, a median, an upper quartile, and a lower quartile for a set of numbers.

8. The non-transitory computer-readable storage medium of claim 7, wherein the executable instructions to detect include executable instructions to apply a statistical test.

9. The non-transitory computer-readable storage medium of claim 8, wherein the statistical test is a Tukey Test.

10. The non-transitory computer-readable storage medium of claim 6, wherein the executable instructions to inform include executable instructions to display a user interface specifying information characterizing the mis-balance in the balanced scorecard.

11. A computer system comprising:
a central processing unit;
memory coupled to the central processing unit storing executable programs to cause the central processing unit to perform operations comprising:
generating a hierarchical tree from a balanced scorecard;
classifying the parent to child relationships in the hierarchical tree, each parent to child relationship in the hierarchical tree being categorized quantitatively by its order in relation to a remaining portion of the hierarchical tree and by a number of children in such parent to child relationship;
identifying the quantitative associations among the parent to child relationships, wherein the quantitative associations include statistical measures characterizing the parent to child relationships;
assessing balance within the balanced scorecard by applying balance criteria to the quantitative associations, one of the applied balance criteria being lag and lead indicators less than a user defined percentage of a total number of indicators in the balanced scorecard, the lag indicators representing outcomes influencing a current performance, and the lead indicators representing outcomes influencing a future performance; and
informing a user of a mis-balance within the balanced scorecard.

12. The system of claim 11, wherein identifying includes detecting an outlier pattern, a median, an upper quartile, and a lower quartile for a set of numbers.

13. The system of claim 12, wherein detecting includes applying a statistical test to identify outliers among the children.

14. The system of claim 13, wherein the statistical test is a Tukey Test.

15. The system of claim 11, wherein informing includes displaying a user interface in a display specifying information characterizing the mis-balance in the balanced scorecard.

* * * * *